Patented June 30, 1925.

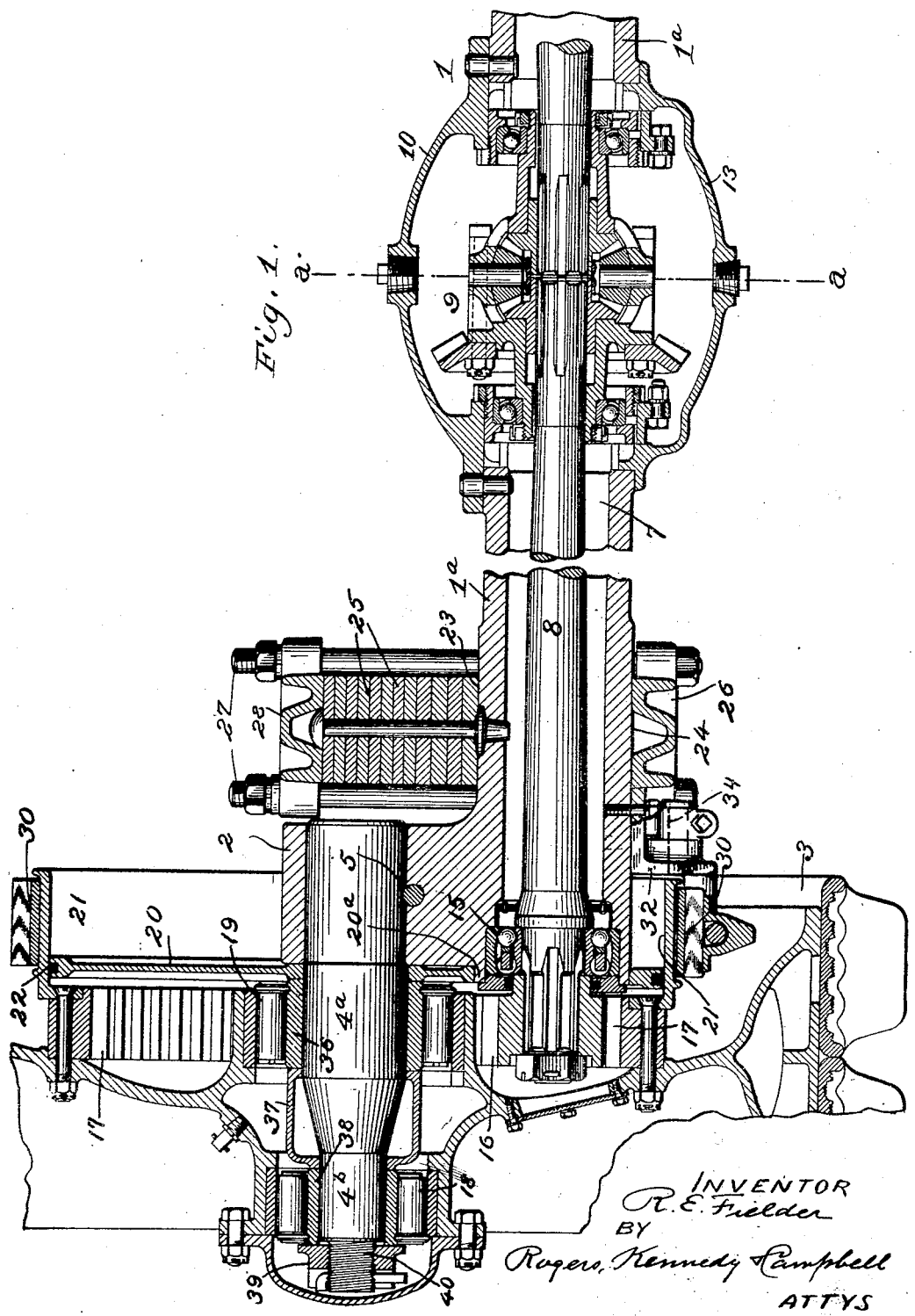

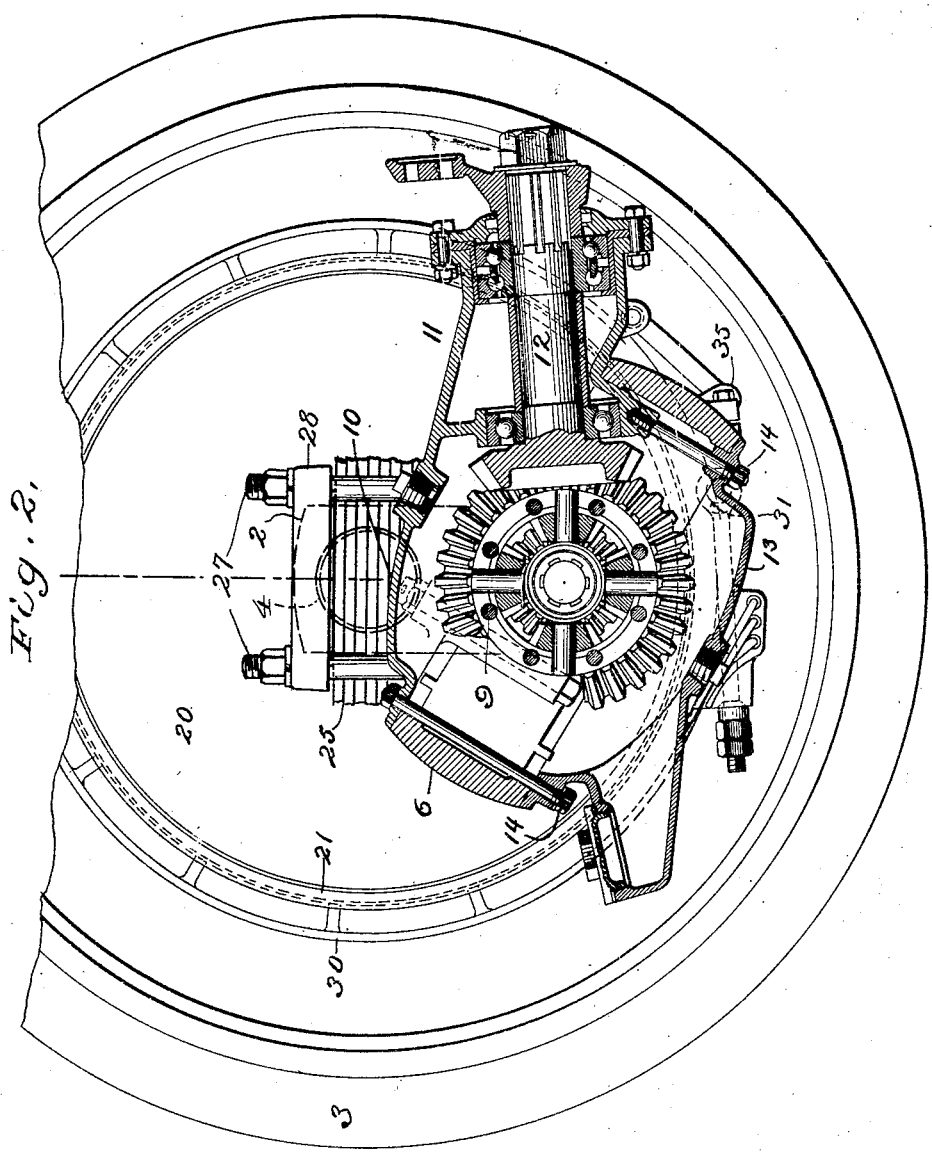

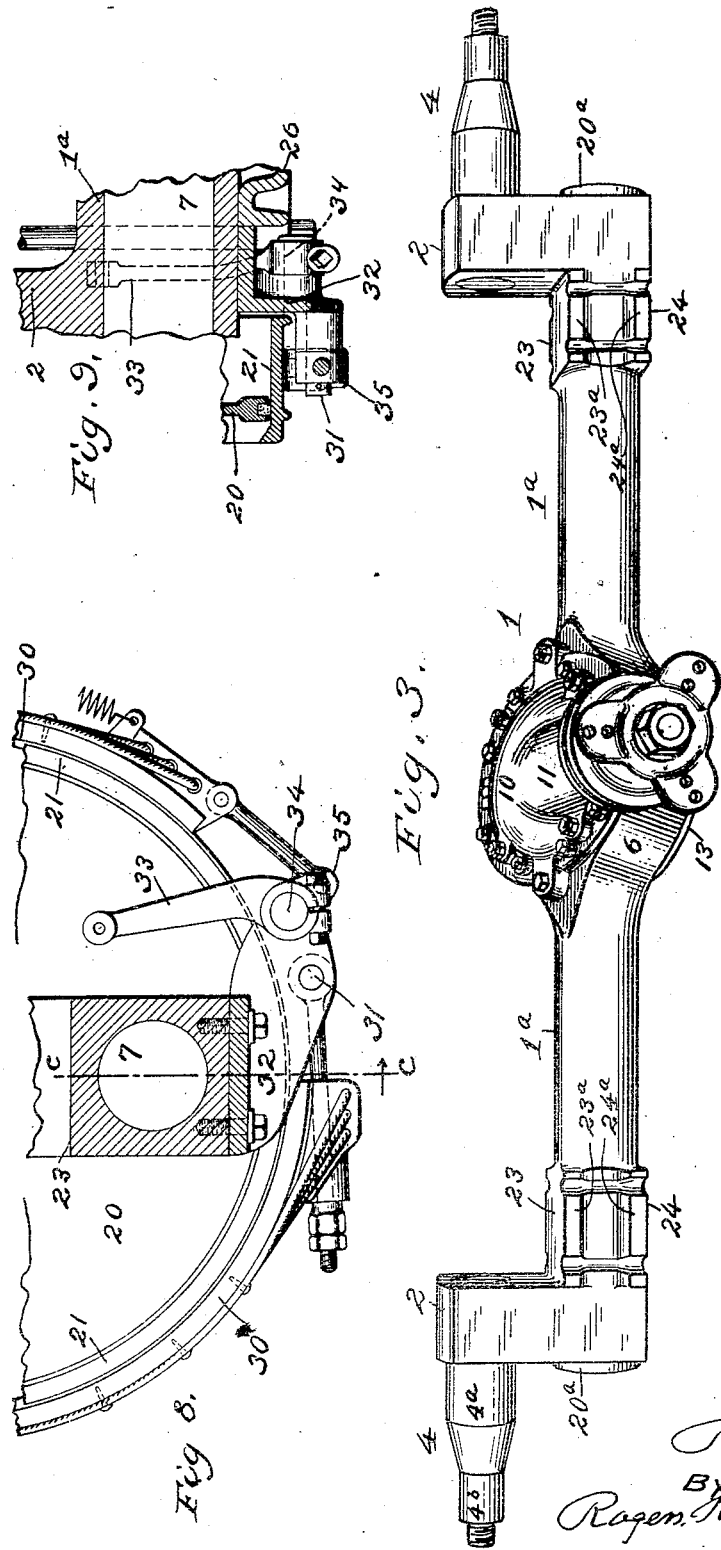

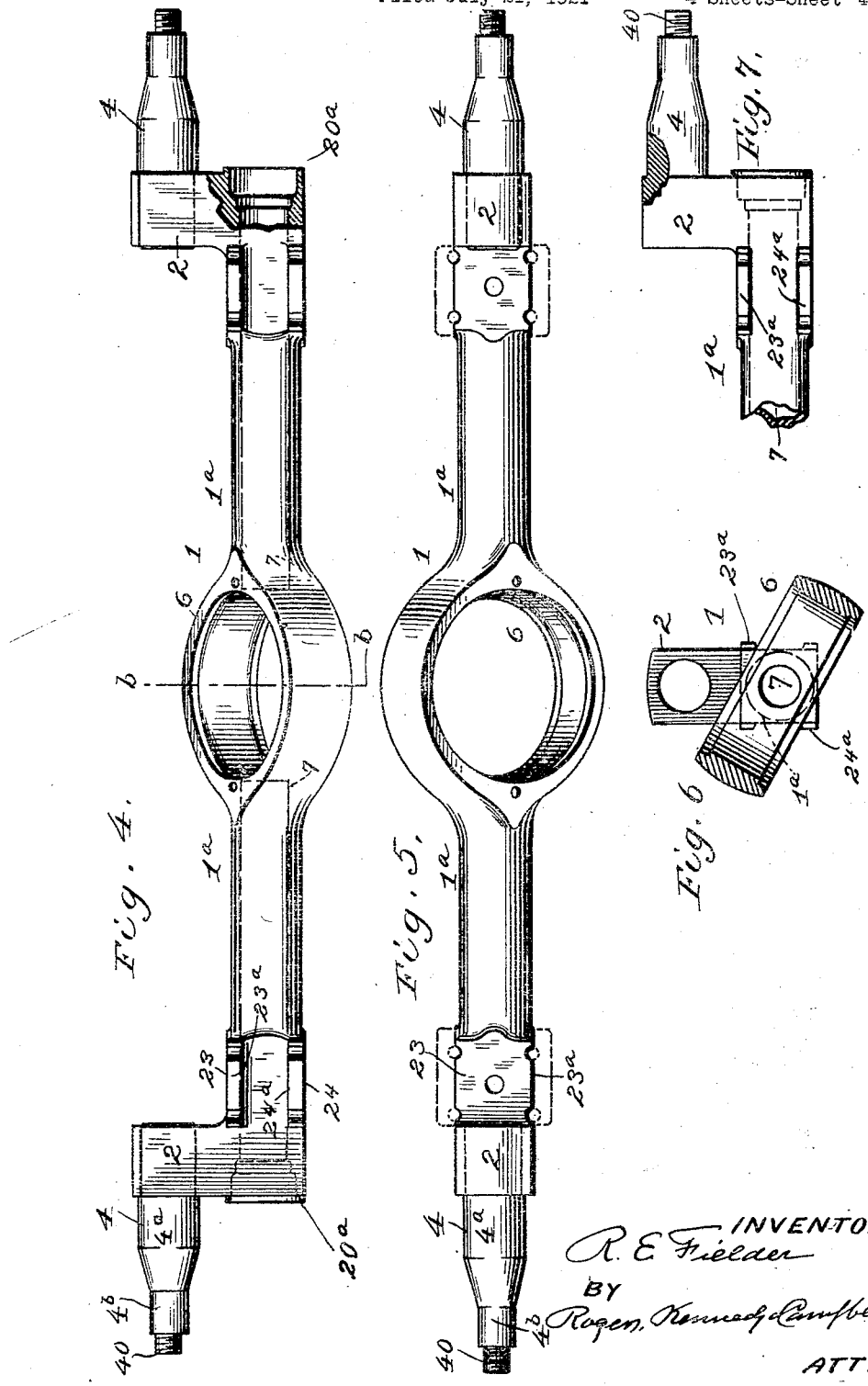

1,544,439

UNITED STATES PATENT OFFICE.

REUBEN E. FIELDER, OF NEW YORK, N. Y.

AXLE DRIVE EQUIPMENT FOR MOTOR VEHICLES.

Application filed July 21, 1921. Serial No. 486,637.

*To all whom it may concern:*

Be it known that I, REUBEN E. FIELDER, a citizen of the United States, residing at New York, in the county of New York and State of New York, have invented certain new and useful Improvements in Axle Drive Equipments for Motor Vehicles, of which the following is a specification, reference being had therein to the accompanying drawings.

This invention relates to rear axle drive equipments for motor vehicles such as auto buses, auto trucks, and the like, by which the vehicle body is supported at a low level with reference to the axis of the wheels. A certain type of rear axle equipment for this purpose comprises a transverse load supporting member on which the drive wheels are rotatably mounted on axes offset vertically above the member, and driven by gears carried by aligned driving axles rotatably sustained by the member and geared to the wheels, the said driving axles receiving their motion through differential gearing from the motor or engine, and the vehicle body being sustained by the load supporting member through the medium of the usual springs.

My invention has to do particularly with constructions of this type, and the invention consists of a transverse load supporting member of improved form and construction having in view great strength and durability and capability of supporting the loads and the strains to the best advantage and without injuries bending or twisting or other displacements. The improved features of construction constituting my invention will be fully described in the specification to follow and the novel parts thereof will be pointed out in the appended claims.

In the accompanying drawings:

Fig. 1 is a central vertical longitudinal section through a portion of a rear drive axle equipment and the driving wheel mounted thereon, with my invention embodied therein.

Fig. 2 is a transverse section through the same on the line $a$—$a$ of Fig. 1.

Fig. 3 is a front perspective view of the transverse load supporting member separated from the parts associated therewith.

Fig. 4 is a front elevation of the same.

Fig. 5 is a top plan view of the same.

Fig. 6 is a transverse section on the line $b$—$b$ of Fig. 4.

Fig. 7 is a fragmentary perspective view of a modified form of the load supporting member.

Fig. 8 is an end elevation of the transverse load supporting member, showing in detail the brake band operating mechanism.

Fig. 9 is a vertical sectional elevation on the line $c$—$c$ of Fig. 8.

Referring to the drawings:

My invention is chiefly concerned with the transverse load supporting member 1 as shown more particularly in Figs. 3, 4, 5 and 6, and in slightly modified form in Fig. 7. This member comprises a main horizontal body portion $1^a$ and two laterally extending arms 2, one on each end thereof, the said body portion and arms being in the form of an integral unitary structure, and the arms extending upwardly vertically to afford supports for the drive wheels 3, one only of which is shown. The drive wheels are rotatably mounted respectively on horizontal spindles 4 which in the preferred form of the invention are seated tightly at their inner ends in horizontal holes or sockets formed in the upper ends of the arms, and are firmly and fixedly secured therein by means, for instance, of a lock pin 5 as shown in Fig. 1. The projecting portions of the spindles are formed with an inner cylindrical bearing surface $4^a$, and with an outer cylindrical bearing surface $4^b$ of relatively smaller diameter than the surface $4^a$ which afford bearing supports respectively for the inner and outer ends of the hubs, as will be more fully described hereinafter.

The body portion of the supporting member is formed at its center with a flat annular hollow boss 6 the plane of which extends at an angle with reference to the horizontal plane of the supporting member, the rear portion of said boss being above the axis of the member and its front portion being below said axis as best shown in Figs. 2 and 6, the annular boss thus extending at a downward and forward inclination relative to the body of the supporting member. From the interior of the boss longitudinal passages or openings 7 extend outwardly in opposite directions through the body of the supporting member and through the end arms to receive the two aligned driving axles 8, and within the boss the differential gearing 9 is mounted and geared to the axles. An upper cap plate 10 is applied to the upper edge, of the boss and is provided with a forwardly extending neck 11 having bearings in which is rotatably mounted a fore and aft extending stub shaft 12 geared at its rear end to the differential gearing and provided at its forward end with means whereby it may be connected with the propeller shaft, so that the motion of the motor will be transmitted to the differential gearing and by the latter to the driving axles. A lower cap plate 13 is applied to the lower edge of the annular boss and is fastened in place by bolts 14 which extend through the two caps and inward of the inner annular surface of the boss as shown in Fig. 2, whereby the latter will be free from bolt holes or recesses which would tend to weaken the same.

At its outer end each driving axle is rotatably supported by means of a ball bearing 15 seated in the outer end of the longitudinal opening 7 in the sustaining member and the axle carries a driving gear 16 meshing with an internal rack 17 on the wheel hub, which latter is rotatably supported at its outer end by a roller bearing 18 surrounding the bearing surface 4$^b$ on the spindle 4, and at its inner end by a roller bearing 19 surrounding the bearing surface 4$^a$ on the spindle; whereby the motion of the axles is transmitted to the driving wheels rotating on axes disposed above the axis of the load supporting member. The internal rack on the drive wheel and the gear wheel on the axle engaging the same, are inclosed oil tight and dust tight by means of a fixed circular disc or plate 20 which surrounds the spindle at the outer side of the arm 2 and extends within an inwardly extending overhanging brake drum 21 on the drive wheel, a packing 22 being inserted between the peripheral edge of the disc and the inner surface of the drum. The plate 20 is prevented from turning on the wheel spindle by reason of its engagement with a boss 20$^a$ projecting outwardly from the outer side of the end arm 2 and surrounding the opening therethrough, the said plate 20 having a circular hole which receives and fits over said boss. The plate 20 is prevented from inward displacement on the spindle by the end arm against which it abuts, and it is held from outward displacement by means of a ring 36 which surrounds the surface 4$^a$ on the spindle and constitutes the inner race ring of the roller bearing 19, which ring is in turn held in place on the spindle by means of a spacer shell 37 surrounding the surface 4$^a$ and extending outwardly and fitting around the surface 4$^b$ of the spindle, and this spacer shell is in turn held against the end of the ring 36 by means of a second ring 38 which surrounds the surface 4$^b$ of the spindle and constitutes the inner casing ring of the roller bearing 18. A nut 39 is screwed on a threaded neck 40 extending outwardly from the spindle and bears against the outer end of the ring 38; whereby the said ring, the spacer shell, and the ring 36 may all be forced inwardly endwise against the disc 20, and thereby hold the same from outward displacement.

At the inner sides of the arms 2, the body portion of the load supporting member is formed at its upper and lower sides with flattened surfaces 23 and 24 respectively, the surface 23 affording a seat for the supporting spring 25, and the surface 24 affording a seat for a clamp plate 26, the spring being fastened firmly to the seat 23 by means of bolts 27 extending through the clamp plate 26 and at the opposite sides of the supporting member and through a clamp plate 28 bearing on the upper side of the spring. In Figs. 3 and 4 I have shown the seating surfaces 23 and 24 as being continued outwardly in the form of flanges 23$^a$ and 24$^a$ having open recesses therein to receive the bolts. In such a construction, the lower clamping plate 26 is desirable to confine the clamping bolts passing through said plate. This plate however may be omitted by extending the flanges as shown by dotted lines in Fig. 5 and forming bolt holes therein to confine the bolts.

While I prefer to form the body portion of the load sustaining member together with its central annular hollow boss and the two upwardly extending end arms, as a single integral unitary structure, and to form the wheel supporting spindles 4 as separate elements to be fastened in the end arms as described, these supporting spindles may be formed integral with the end arms as shown in Fig. 7 in which case the entire structure including the supporting spindles would constitute an integral unitary element.

The formation of the transverse load supporting member with its central hollow boss and its lateral end arms as an integral unitary structure, gives it great strength and strain resisting properties, and avoids the employment of separate connected parts which would be liable to become loose and subject to relative displacements under the severe conditions encountered in practical use. By disposing the hollow central boss in a plane inclined downwardly and forwardly relative to the body portion of the supporting member, the said boss is presented edgewise to the resultant of the load force acting downwardly on the member and the forces acting on the wheels when the rotation of the latter is resisted by the application of the brakes or by skidding. The result is that the severe stresses due to said resultant are resisted by the load supporting member under the most favorable conditions to avoid injurious strains thereon.

As shown more particularly in Figs. 1, 2, 8 and 9, the brake band 30 which encircles the brake flange 21, has one end anchored to a stud 31 on a bracket plate 32 bolted to the underside of the transverse load supporting member at the outer side of the clamping plate 25, and has its other end connected operatively with an operating lever 33 supported by said bracket plate. The bracket plate as shown in Fig. 9 has journalled in it a short horizontal shaft 34 which has attached to one end a crank 35 to which the movable end of the brake band is connected, and at its opposite end the shaft has fixed to it the lever 33 for operating it.

Having thus described my invention, what I claim is:

1. In a motor vehicle, the combination of a transverse load supporting member provided with an end arm, a wheel spindle projecting outwardly from said arm, a drive wheel provided with a hub surrounding the projecting portion of the spindle and provided also with an inwardly extending brake drum, a closure disc surrounding the spindle and abutting against the outer side of the end arm and seated within the drum, a nut on the outer end of the spindle, and means surrounding the spindle and engaged at its outer end by the nut and abutting at its inner end against the closure disc, the said wheel hub being rotatably supported by said means.

2. In a motor vehicle, the combination of a transverse load supporting member provided with an end arm, a wheel spindle projecting outwardly from said arm, a drive wheel provided with a hub surrounding the projecting portion of the spindle and provided also with an inwardly extending brake drum, a closure disc seated within the brake drum and surrounding the spindle and abutting against the outer side of the end arm, an inner ring surrounding the inner portion of the spindle and abutting against the disc, an outer ring surrounding the outer portion of the spindle, a spacer shell sustained by the spindle between said rings, the said hub being rotatably supported by the rings, and a nut screwed on the outer end of the spindle and bearing against the outer end of the outer ring; whereby the outer ring, the spacing shell and the inner ring may be forced inwardly by the nut and thereby confine the closure disc in place.

In testimony whereof, I have affixed my signature hereto.

REUBEN E. FIELDER.